United States Patent
Ishii et al.

(10) Patent No.: US 6,753,932 B2
(45) Date of Patent: Jun. 22, 2004

(54) METHOD AND APPARATUS FOR CONTROLLING CONVERGENCE OF COLOR SIGNALS

(75) Inventors: Shinya Ishii, Kanagawa (JP); Nobuo Yamazaki, Chiba (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 09/859,275

(22) Filed: May 17, 2001

(65) Prior Publication Data

US 2002/0036723 A1 Mar. 28, 2002

(30) Foreign Application Priority Data

May 19, 2000 (JP) ........................................ 2000-147769

(51) Int. Cl.[7] .......................... H04N 3/22; H04N 3/26; H04N 9/28
(52) U.S. Cl. ...................... 348/807; 348/557; 348/717; 348/745; 315/368.11
(58) Field of Search .................................. 348/806, 807, 348/745, 746, 747, 497, 554, 555, 556, 567, 714–718; 315/368.11, 368.12; 345/600, 601, 603, 213; H04N 3/22, 3/26, 9/28

(56) References Cited

U.S. PATENT DOCUMENTS

| | | | | |
|---|---|---|---|---|
| 4,857,998 A | * | 8/1989 | Tsujihara et al. | 348/747 |
| 5,532,764 A | * | 7/1996 | Itaki | 348/745 |
| 5,532,765 A | * | 7/1996 | Inoue et al. | 348/807 |
| 5,898,465 A | * | 4/1999 | Kawashima et al. | 348/745 |
| 5,939,843 A | * | 8/1999 | Kimoto et al. | 315/368.12 |
| 6,002,454 A | * | 12/1999 | Kajiwara et al. | 348/806 |
| 6,288,758 B1 | * | 9/2001 | Chujo | 348/807 |
| 6,480,242 B1 | * | 11/2002 | Okada et al. | 348/807 |
| 2002/0015113 A1 | * | 2/2002 | Chauvin et al. | 348/745 |

* cited by examiner

*Primary Examiner*—John Miller
*Assistant Examiner*—Brian Yenke
(74) *Attorney, Agent, or Firm*—Frommer Lawrence & Haug LLP; William S. Frommer (57) ABSTRACT

An image processing apparatus is disclosed by which correction of convergence and correction of distortion of an image can be performed with a high degree of accuracy. Correction data to be used for correction of position errors of the three colors of red, green and blue obtained by an adjustment apparatus in advance are stored in a storage section. The stored correction data are outputted to a correction waveform outputting section through a control circuit when necessary. The correction waveform outputting section produces correction waveforms based on the correction data inputted thereto and outputs the correction waveforms to a clock signal generation circuit. The clock signal generation circuit generates clocks, and the video data of red, green and blue stored in the memory are read out in response to the clock signals.

9 Claims, 13 Drawing Sheets

FIG. 1 (PRIOR ART)

FIG. 2B (PRIOR ART) — WITH DEFLECTION CORRECTION

FIG. 2A (PRIOR ART) — WITHOUT DEFLECTION CORRECTION

WITH CORRECTION

FIG.11

METHOD AND APPARATUS FOR CONTROLLING CONVERGENCE OF COLOR SIGNALS

BACKGROUND OF THE INVENTION

This invention relates to an image processing apparatus and method as well as a recording medium, and more particularly to an image processing apparatus and method as well as a recording medium suitable for use with an apparatus which has functions for convergence correction, correction of video distortion and correction of non-uniform brightness or chromaticity of a video.

In recent years, a cathode ray tube display apparatus of the raster scanning system has been popularized as a display apparatus for displaying an image. The cathode ray tube display apparatus corrects images of three colors of, for example, red, green and blue against displacement in superposition to display an image. In the following description, such correction against displacement is referred to as "convergence correction".

Figure 1:
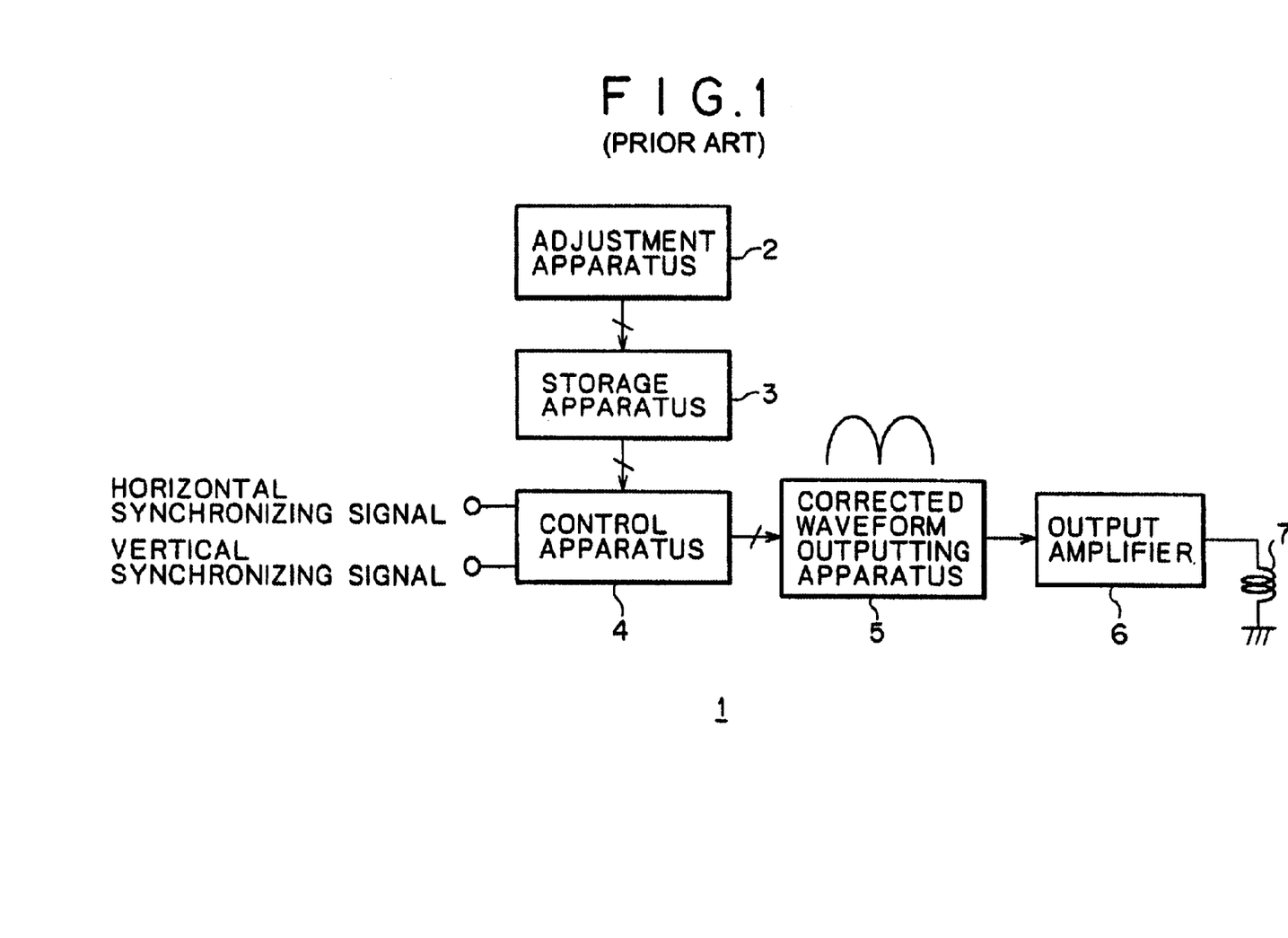
FIG. 1 is a block diagram showing a configuration of an example of conventional convergence correction apparatus.

In such a cathode ray tube display apparatus as described above, convergence correction is performed with a high degree of accuracy popularly using a method wherein convergence correction current is supplied to a convergence correction coil. FIG. 1 shows an example of configuration of a convergence correction apparatus that effects such convergence correction. Referring to FIG. 1, the convergence correction apparatus 1 shown includes an adjustment apparatus 2, a storage apparatus 3, a control apparatus 4, a corrected waveform outputting apparatus 5, an output amplifier 6 and a correction coil 7.

In the convergence correction apparatus 1 shown in FIG. 1, convergence adjustment data are produced by the adjustment apparatus 2 in advance and stored into the storage apparatus 3. The stored convergence adjustment data are read out by the control apparatus 4 and outputted to the corrected waveform outputting apparatus 5 together with synchronization frequency information, raster scan position information and other necessary information determined by the control apparatus 4. The convergence adjustment data inputted to the corrected waveform outputting apparatus 5 are worked based on the synchronization frequency information, raster scan position information and other information so as to allow optimum convergence correction, and then are converted into a convergence correction waveform and outputted to the output amplifier 6. The convergence correction waveform inputted to the output amplifier 6 is amplified in voltage and amplitude and supplied to the correction coil 7 attached to the cathode ray tube so that convergence correction is performed.

Conventionally, roughly two correction waveform generation methods are available including a function generation method and a memory mapping method. The function generation method approximates a convergence correction waveform to a finite function based on information such as convergence correction data at a convergence adjustment point and a synchronization frequency to generate a convergence correction waveform in synchronism with raster scanning of the cathode ray tube. According to the function generation method, the memory capacity for storing adjustment data may be smaller than that of the memory mapping method. Therefore, the function generation method is advantageous in that it can be produced at a comparatively low cost, but is disadvantageous in that it is low in degree of freedom in correction.

Meanwhile, according to the correction waveform generation method of the memory mapping method, a display screen is divided into gratings, and regarding each grating point as an adjustment point, a convergence correction amount necessary for the adjustment point is stored into a memory in advance. Then, at each grating point, the corresponding adjustment data stored in the memory is read out, but at any other point, correction data is obtained by interpolation processing using a straight line or a quadratic curve based on the correction data at the grating points, and is used to generate a convergence correction waveform. The memory mapping method exhibits a higher degree of freedom in correction and allows correction of convergence with a higher degree of accuracy than the function generation method. Therefore, particularly a display unit for which a high display quality is required such as, for example, a display unit for a computer frequently uses the memory mapping method.

Figure 2A:
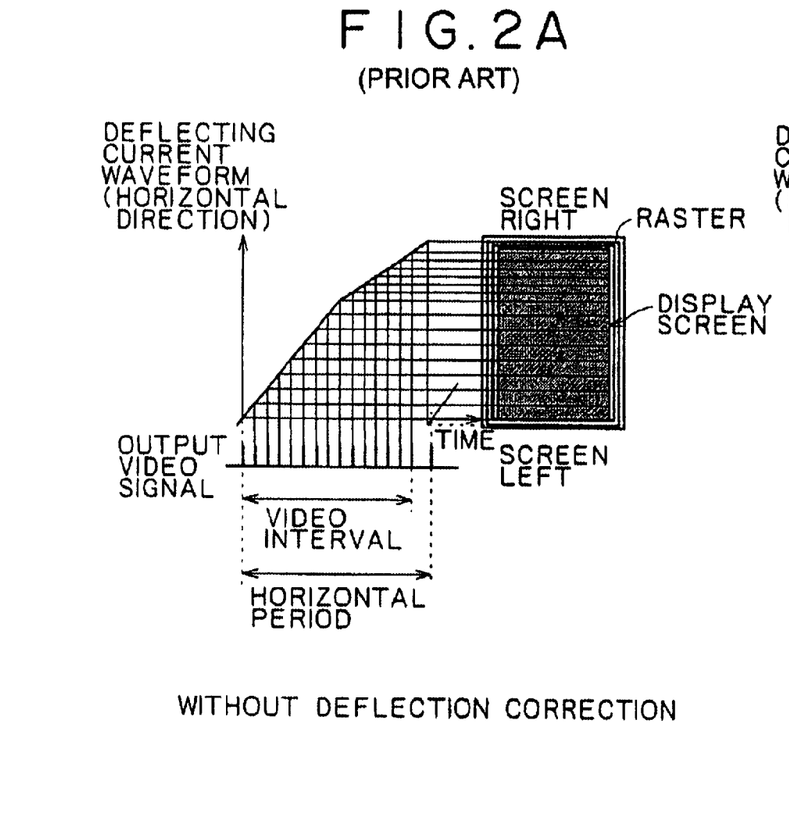
FIGS. 2A and 2B are schematic views illustrating horizontal linearity correction by a video signal adjustment method.
Figure 2B:
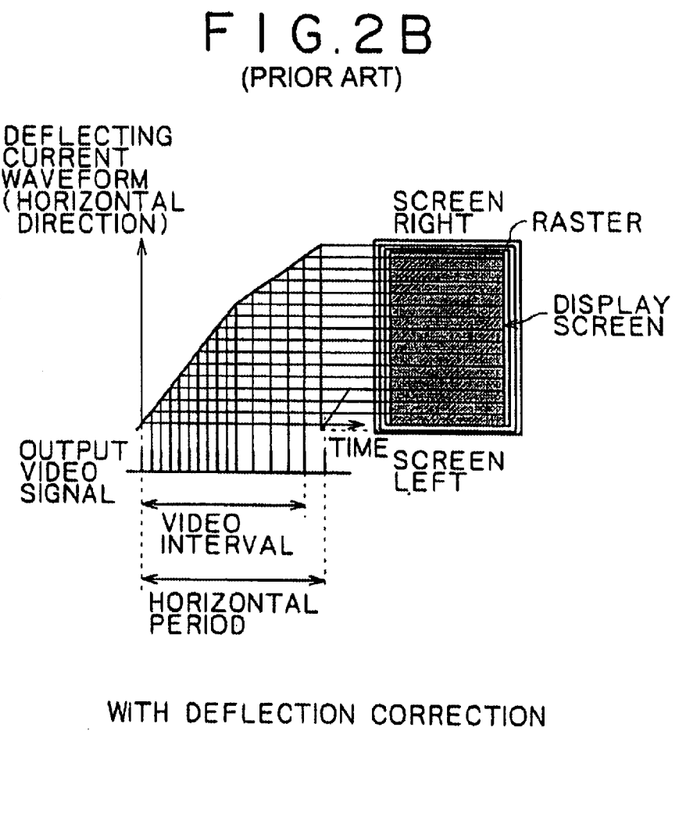

It is popularly known that a position error of a video displayed on a cathode ray tube can be corrected by adjusting the output timing of video signal data. FIGS. 2A and 2B illustrate horizontal linearity correction by adjustment of the output timing of video data in a horizontal period. Particularly, FIG. 2A illustrates a displayed video when a position error is not corrected, and FIG. 2A illustrates a displayed video when the output timing of video signal data is adjusted to perform horizontal linear correction. Where the horizontal deflecting current is distorted, when no correction is performed, the horizontal linearity is distorted as seen in FIG. 2A, but when the video signal is adjusted in a direction of the time base so as to correct the distortion of the horizontal deflecting current, the horizontal linearity can be corrected as seen in FIG. 2B.

In the example illustrated in FIGS. 2A and 2B, the output timing of video signal data is adjusted in a horizontal period. However, if the output timing is adjusted in a vertical period, then correction of image distortion in a vertical period can be performed in a similar manner.

Figure 3:
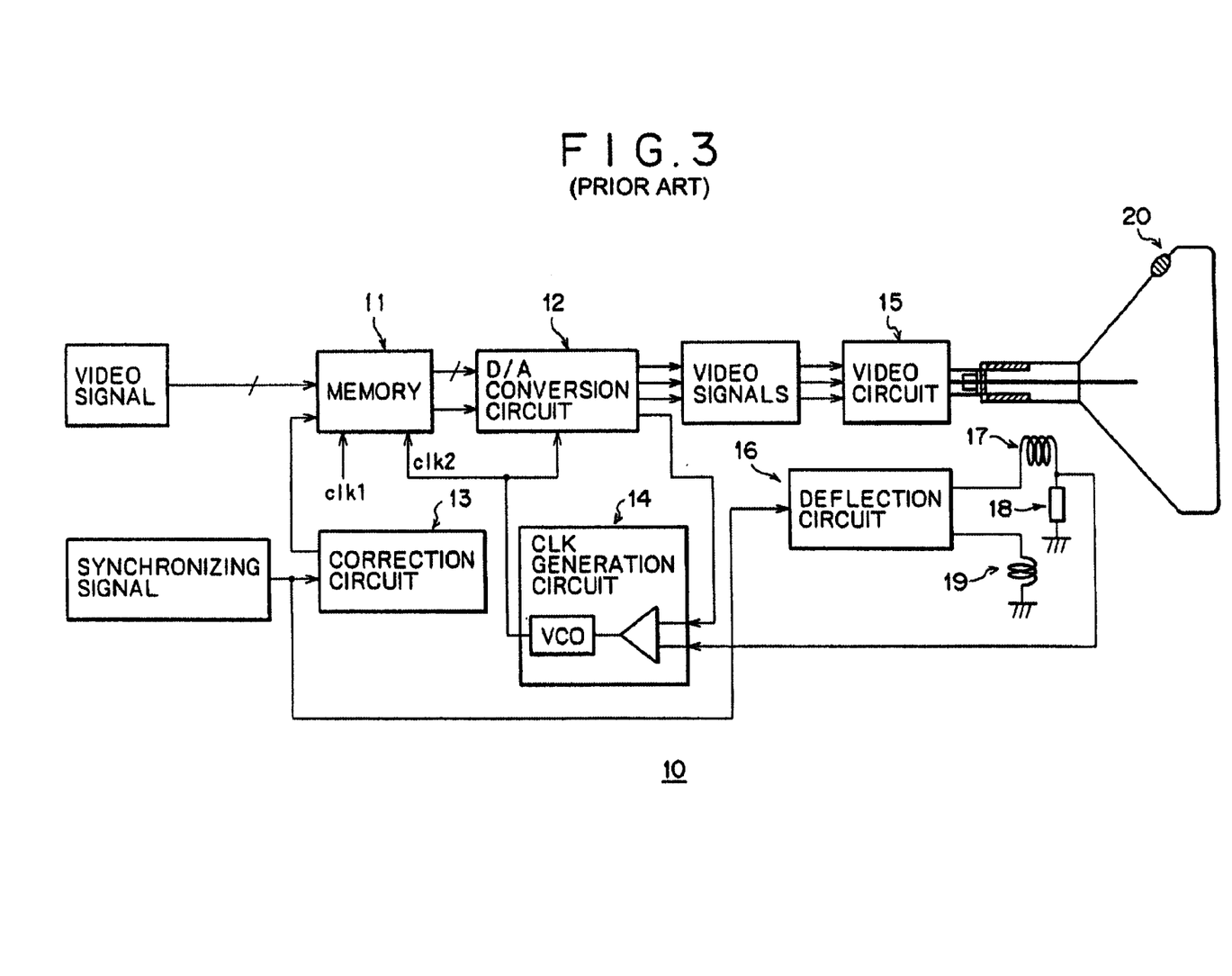
FIG. 3 is a block diagram showing a configuration of an example of conventional display apparatus.

FIG. 3 shows an example of a display apparatus which performs such deflection correction as described above with reference to FIGS. 2A and 2B. Referring to FIG. 3, the display apparatus 10 shown includes a memory 11, a digital/analog (D/A) conversion circuit 12, a correction circuit 13, a clock (CLK) generation circuit 14 for generating an adjustment clock signal, a video circuit 15, a deflection circuit 16, a horizontal deflecting coil 17, a measuring resistor 18 for detecting horizontal deflecting current, a vertical deflecting coil 19, and a cathode ray tube 20.

An input video signal is written into the memory 11 at a timing of a first clock signal clk1. Then, the image data written in the memory 11 are read out at another timing of a second clock signal clk2 and converted into an analog video signal by the D/A conversion circuit 12, whereafter they are inputted to the video circuit 15. The image signal inputted to the video circuit 15 is amplified by the video circuit 15 and applied to the cathode of the cathode ray tube 20.

On the other hand, the correction circuit 13 produces a reference signal for horizontal deflecting current in synchronism with a synchronizing signal. The reference signal produced is written into the memory 11 at a timing of the first clock signal clk1 similarly to the video signal, and is then read out from the memory 11 at another timing of the second clock signal clk2, converted into an analog video signal by the D/A conversion circuit 12 and inputted to the clock generation circuit 14.

Meanwhile, the synchronizing signal inputted to the deflection circuit 16 to drive the horizontal deflecting coil 17 and the vertical deflecting coil 19 to form a raster on the cathode ray tube 20. The measuring resistor 18 is a detecting resistor for measuring the horizontal deflecting current, and a voltage which increases in proportion to the horizontal deflecting current is inputted from the measuring resistor 18 to the clock generation circuit 14. The clock generation circuit 14 compares the detection voltage of the horizontal defection current inputted thereto from the measuring resistor 18 with the reference waveform of the adjusted horizontal deflecting current inputted thereto from the D/A conversion circuit 12 through the memory 11 and supplies an amplified waveform of a difference between the two input waveforms to a voltage-controlled oscillator (VCO). The VCO generates a second clock signal clk2 adjusted in accordance with the difference between the two input waveforms and supplies the second clock signal clk2 to the memory 11 and the D/A conversion circuit 12.

Through the series of operations described above, the second clock signal clk2 is adjusted so that the difference between the reference waveform of the horizontal deflecting current and the waveform of the actual deflecting current may be minimized. Consequently, the video signal inputted to the cathode of the cathode ray tube 20 is adjusted in the direction of the time base so as to correct the distortion of the horizontal deflecting current thereby to correct the position error of the video.

In the system described above, a reference waveform of horizontal deflecting current and the waveform of actual horizontal deflecting current are compared with each other, and the difference between the waveforms is fed back to adjust the clock signal so that the difference may be eliminated. As a result, also the output timing of video signal data is adjusted to correct the position error of the video.

In the convergence correction described above, the output amplifier 6 is used to supply correction current to the convergence correction coil 7 with reference to a convergence correction waveform produced by the function generation method or the memory mapping method to correct the convergence. However, in order to perform such convergence correction, high current must be supplied to the correction coil 7 for convergence correction. Therefore, it is difficult to miniaturize the correction coil 7, the output amplifier 6 for driving the correction coil 7 and pertaining elements, and there is a subject to be solved in that miniaturization of the convergence correction apparatus 1 itself is difficult.

Also it is a subject that the power loss of the output amplifier 6 is great. Further, in order to correct the convergence with a high degree of accuracy, a system is required which has an increased number of adjustment points like the memory map method and has a high degree of freedom in correction. Actually, however, phase delay of convergence correction, interference between adjustment points and so forth are caused by a limitation to the slew rate characteristic of the output amplifier, eddy current loss in the inside of the cathode ray tube and other parameters. Thus, there is a subject to be solved in that further augmentation of the accuracy in correction of the convergence is difficult.

Figure 4:
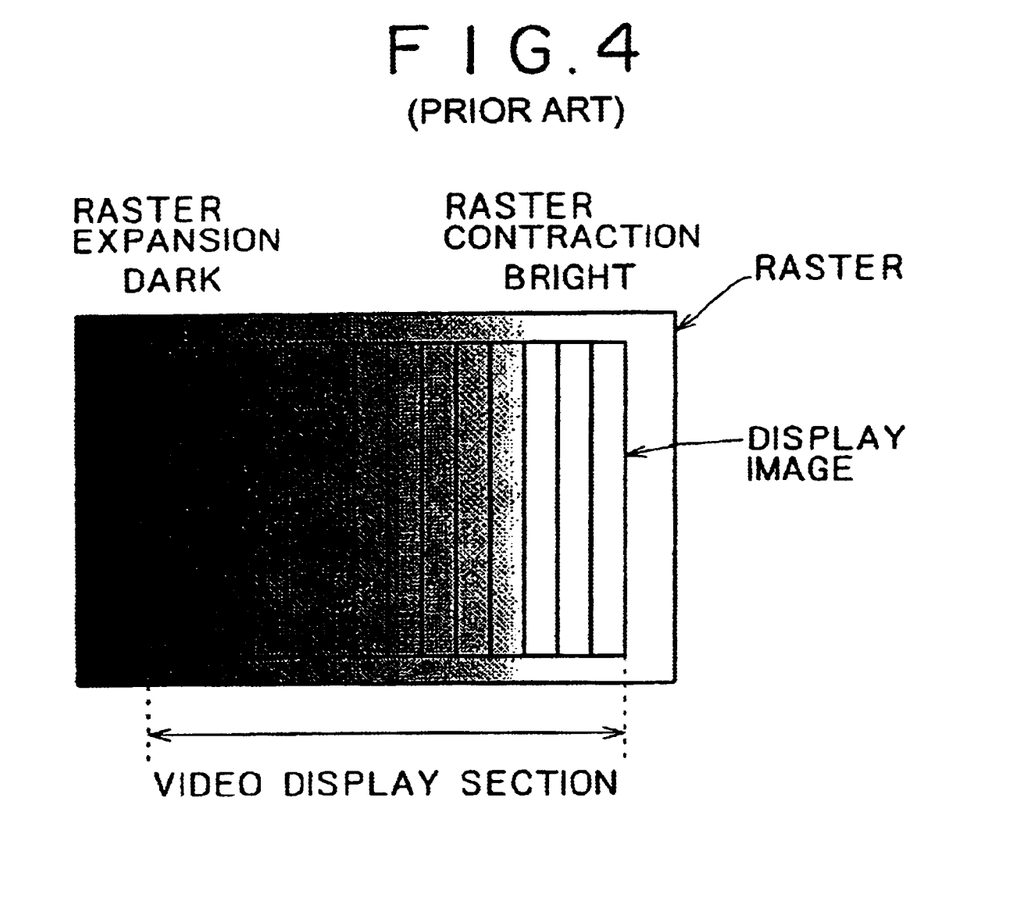
FIG. 4 is a schematic view illustrating linearity correction by a video signal adjustment method.

On the other hand, where such a method of correcting the position error of a video on the display of the cathode ray tube by adjusting the output timing of video signal data as described above is used to perform correction of distortion of an image, a raster which is not uniform in density appears as seen in FIG. 4 and makes the brightness non-uniform.

Further, since the position error is detected from the waveform of horizontal deflecting current, although correction of distortion of an image can be performed, the position errors of the three colors of red, green and blue cannot be detected, and there is a subject to be solved in that the convergence cannot be corrected.

SUMMARY OF THE INVENTION

It is an object of the present invention to provide an image processing apparatus and method by which miniaturization and reduction in power consumption of a convergence correction circuit and a deflection circuit can be achieved.

It is another object of the present invention to provide an image processing apparatus and method by which correction of convergence and video distortion and correction of non-uniformity of the brightness and the chromaticity can be performed with a high degree of accuracy.

In order to attain the objects described above, according to the present invention, the output timings of video signals of red, green and blue are adjusted independently of one another to correct the position errors of the three videos individually.

According to an aspect of the present invention, there is provided an image processing apparatus, comprising inputting means for inputting a plurality of video signals corresponding to different colors therethrough, storage means for storing the video signals inputted through the inputting means, production means for producing correction data to be used for correction of convergence, generation means for generating a clock signal for each of the video signals corresponding to the different colors based on the correction data produced by the production means, and readout means for reading out the video signals stored in the storage means in response to the clock signals generated by the generation means.

The video signals inputted through the inputting means may correspond at least two of a video signal of red, another video signal of green and a further video signal of blue.

The video signals inputted through the inputting means may be digital video signals which are digital video signals obtained by conversion of analog video signals, digital video signals transmitted and decoded by transition minimized differential signaling (TMDS), digital video signals transmitted and decoded by low voltage differential signaling (LVDS) or digital video signals transmitted and decoded by giga-bit video interface (GVIF).

The image processing apparatus may further comprise arithmetic operation means for arithmetically operating a correction parameter to be used for correction of image distortion from data which include at least one of synchronizing signal data, video size data and video phase data, the generation means generating the clock signals further based on the correction parameter.

In this instance, the image processing apparatus may further comprise conversion means for converting the video signals inputted through the inputting means into video signals whose non-uniformity in brightness and chromaticity are corrected based on the correction parameter arithmetically operated by the arithmetic operation means.

According to another aspect of the present invention, there is provided an image processing method, comprising a storage control step of controlling storage of a plurality of video signals corresponding to different colors, a production step of producing correction data to be used for correction of convergence, a generation step of generating a clock signal for each of the video signals corresponding to the different colors based on the correction data produced by the processing in the production step, and a readout control step of controlling reading out of the video signals, whose storage has been controlled by the processing in the storage control step, in response to the clock signals generated by the processing in the generation step.

According to a further aspect of the present invention, there is provided a recording medium on which a computer-readable program is recorded, the program comprising a storage control step of controlling storage of a plurality of video signals corresponding to different colors, a production step of producing correction data to be used for correction of convergence, a generation step of generating a clock signal for each of the video signals corresponding to the different colors based on the correction data produced by the processing in the production step, and a readout control step of controlling reading out of the video signals, whose storage has been controlled by the processing in the storage control step, in response to the clock signals generated by the processing in the generation step.

With the image processing apparatus, the image processing method and the recording medium, a plurality of video signals corresponding to different colors are stored, and correction data to be used for correction of convergence are produced. Then, a clock signal is generated for each of the video signals corresponding to the different colors based on the correction data, and the stored video signals are red out in response to the generated clock signals.

Consequently, miniaturization of a convergence correction circuit and a deflection circuit and reduction of the power consumption can be anticipated, and besides convergence correction can be performed with a high degree of accuracy.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

A display apparatus to which the present invention is applied adjusts the output timings of output video signals of red, green and blue independently of one another with respect to an input digital video signal to individually correct the position errors of videos of the three colors so that convergence and image distortion which occur when the video signal is displayed on a cathode ray tube can be corrected simultaneously.

Figures 5A, 5B:
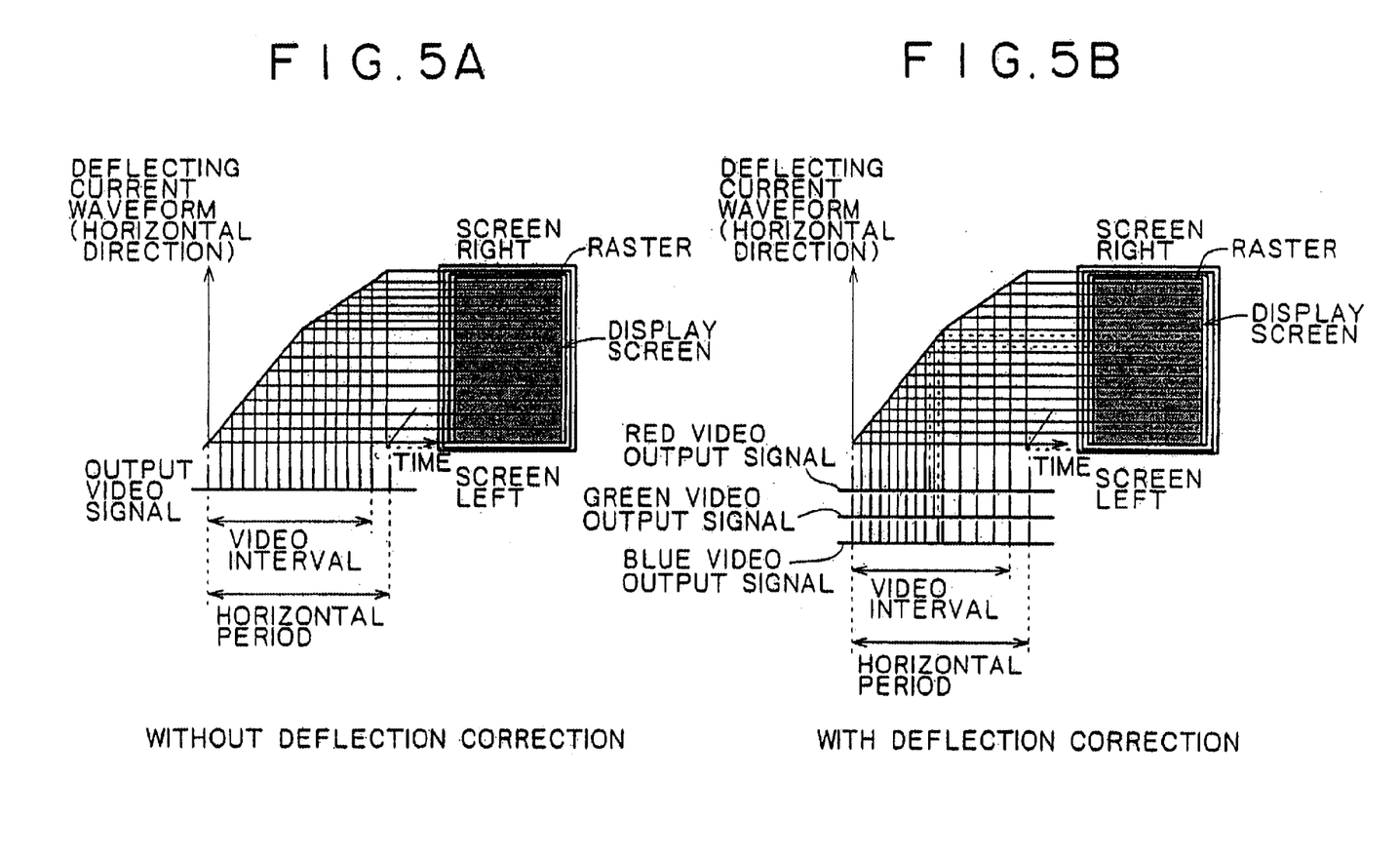
FIGS. 5A and 5B are schematic views illustrating correction of image distortion and convergence by output adjustment of a video signal.

FIGS. 5A and 5B illustrate that horizontal linearity correction can be performed and also convergence correction can be performed by adjusting the output timings of video signal data of the three colors of red, green and blue independently of one another in a horizontal period. FIG. 5A shows a display screen where such correction as mentioned above is not performed while FIG. 5B shows another display screen where such correction as mentioned above is performed. It can be seen from FIG. 5B that correction of horizontal linearity and correction of horizontal convergence can be performed by adjusting the output timings of the three colors of red, green and blue independently of one another in the time base direction so as to correct the position errors of videos of the three colors.

Further, while, in the example illustrated in FIGS. 5A and 5B, the output timings of video signal data are adjusted in a horizontal period, also it is possible to correct miss convergence and image distortion in a vertical period similarly by further adjusting the output timings of the video signal data in a vertical period. Also correction of the brightness of a screen or the nonuniformity in color can be performed through arithmetic operation processing of video data. A configuration of a form of a display apparatus which performs such correction as described above is shown in FIG. 6.

Figure 6:
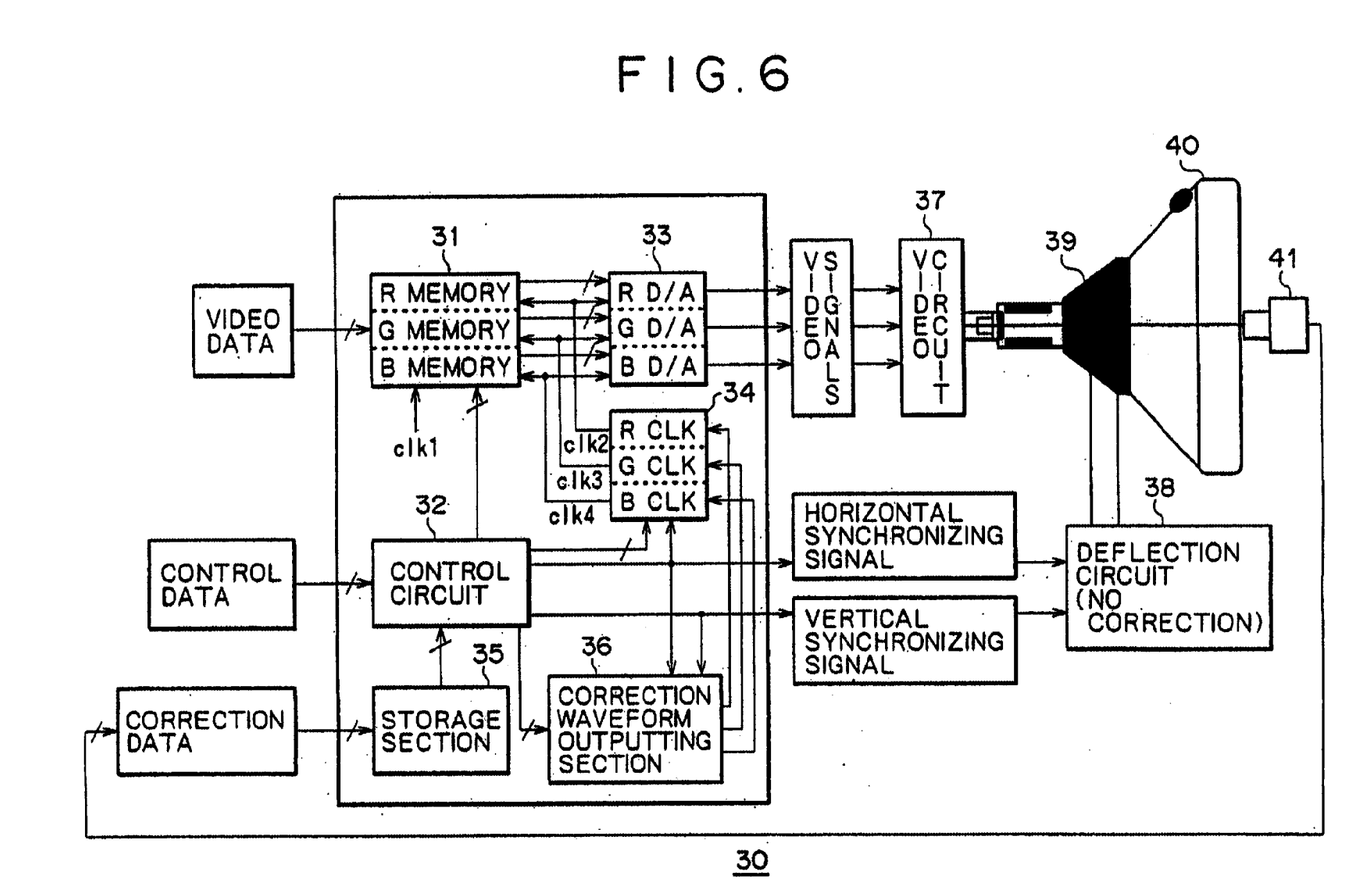
FIG. 6 is a block diagram showing a configuration of a display apparatus to which the present invention is applied.

Referring to FIG. 6, the display apparatus is denoted by 30 and includes a memory circuit 31, a control circuit 32 for generating various timing signals and control signals, a D/A conversion circuit 33, a clock signal generation circuit 34 for generating three different clock signals, a storage section 35 for storing correction data, a correction waveform outputting section 36 for generating three different clock modulation waveforms, a video circuit 37, a deflection circuit 38 having no image distortion correction circuit, a deflection coil 39, a cathode ray tube 40, and an adjustment apparatus 41. The adjustment apparatus 41 may be formed as an apparatus separate from or incorporated in the display apparatus 30.

In the display apparatus 30 shown in FIG. 6, video data are a digital video signal obtained by converting an analog video signal into digital data by means of an A/D converter (not shown) or another video signal obtained by decoding digital data transmitted by a digital interface such as a TMDS digital interface. Control data include synchronizing signals, clock signals and control signals. Correction data are image distortion correction data determined by the adjustment apparatus 41 or the like.

The digital video data are written into the memory circuit 31 at a timing of a first clock signal clk1. Of the video data written in the memory circuit 31, for example, video data of red are read out at a timing of a second clock signal clk2 generated by the clock signal generation circuit 34. Similarly, green video data are read out at a timing of a third clock signal clk3 generated by the clock signal generation circuit 34, and blue video data are read out at a timing of a fourth clock signal clk4 generated by the clock signal generation circuit 34.

The read out image data of red, green and blue are converted into and outputted as analog video signals at respective timings by the D/A conversion circuit 33. The analog video signals are amplified by the video circuit 37 and applied to the cathode of the cathode ray tube 40.

Meanwhile, the control circuit 32 generates horizontal and vertical synchronizing signals based on the control data inputted thereto and outputs the signals to the deflection circuit 38. The deflection circuit 38 drives the deflection coil 39 to form a raster on the cathode ray tube 40. However, since the deflection circuit 38 and the deflection coil 39 have no convergence correction circuit and no image distortion correction circuit, a video displayed on the cathode ray tube 40 suffers from miss convergence and image distortion.

Therefore, the position errors of the three colors of red, green and blue are detected by the adjustment apparatus 41 in advance, and correction data for correction of the position errors are stored into the storage section 35. The correction data stored in the storage section 35 are read out under the control of control circuit 32 and inputted to the correction waveform outputting section 36. Thereupon, in order to allow optimum image distortion correction to be always performed even when the signal frequency, the raster size, the video phase or the like is changed, control parameters are arithmetically operated from synchronizing signal data, video size data, video phase data, correction data and other necessary data and outputted to the correction waveform outputting section 36 similarly.

The correction waveform outputting section 36 produces three different correction waveforms necessary to correct the position errors of the three colors of red, green and blue from the correction data, correction parameters, horizontal synchronizing signal and vertical synchronizing signal inputted thereto. The three different correction waveforms produced in this manner are inputted to the clock signal generation circuit 34, by which a second clock signal clk2, a third clock signal clk3 and a fourth clock signal clk4 adjusted in accordance with the correction waveforms are produced. Since the three different clock signals clk2, clk3 and clk4 are adjusted in the time base direction so that the position errors of the three colors of red, green and blue may be corrected, miss convergence or image distortion of the video displayed on the cathode ray tube 40 is corrected by the series of operations described above.

Figure 7:
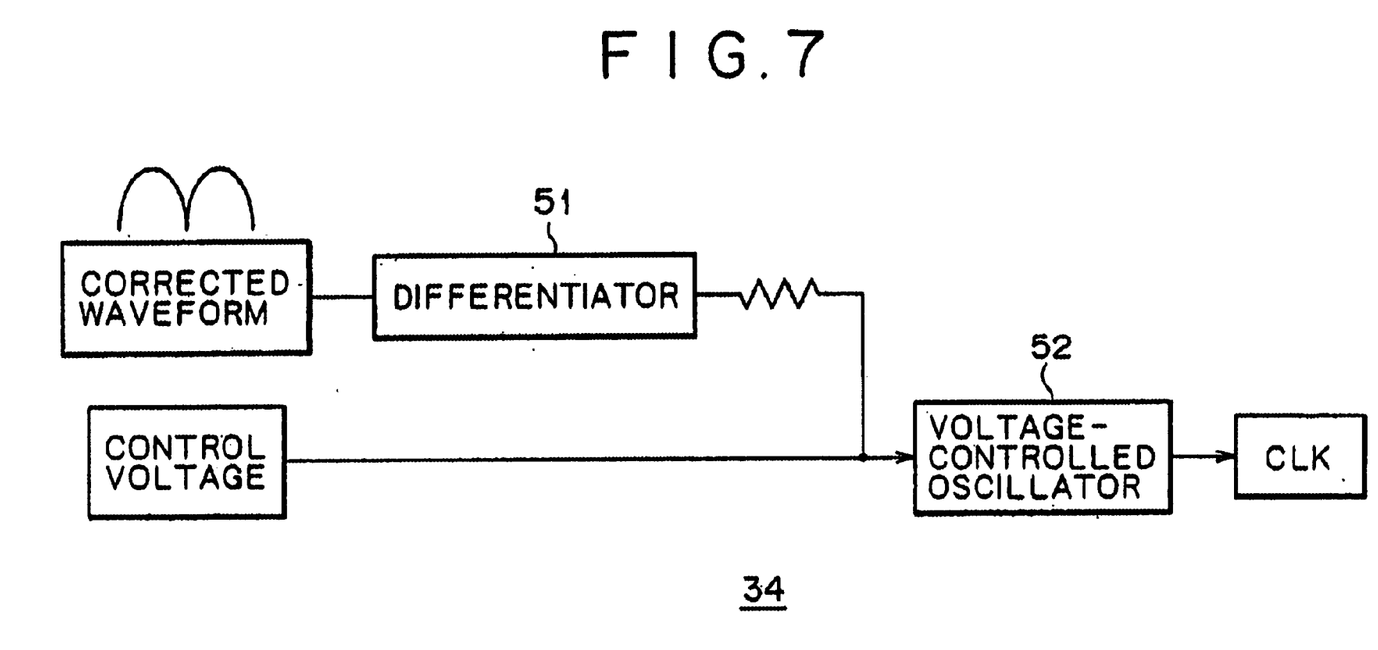
FIG. 7 is a block diagram showing an internal configuration of a clock signal generation circuit shown in FIG. 6.

FIG. 7 shows an internal configuration of the clock signal generation circuit 34 of the display apparatus 30 shown in-FIG. 6. FIG. 7 particularly shows only a portion of the clock signal generation circuit 34 which generates one clock signal (for example, second clock signal clk2). Also portions for generation of the other clock signals have a similar configuration. Referring to FIG. 7, the portion of the clock signal generation circuit 34 shown includes a differentiator 51 and a voltage-controlled oscillator 52.

It is to be noted that, while, in FIG. 7, the differentiator 51 is provided in the inside of the clock signal generation circuit 34, it is possible to employ another configuration wherein the differentiator 51 provided in the clock signal generation circuit 34 is eliminated, for example, while the correction waveform outputting section 36 of the display apparatus 30 shown in FIG. 6 is designed to perform digital differential arithmetic operation upon production of a correction waveform and the correction waveform obtained by the differential arithmetic operation is inputted to the clock signal generation circuit 34.

In FIG. 7, the correction waveform is an image distortion correction waveform generated by the correction waveform outputting section 36 (FIG. 6). The control voltage is a control signal produced by the control circuit 32 (FIG. 6) for controlling the clock frequency. When the control voltage produced by the control circuit 32 is inputted to the voltage-controlled oscillator 52, the voltage-controlled oscillator 52 produces a clock signal for video signal outputting. Further, for example, a position error correction waveform of red produced by the correction waveform outputting section 36 is added through the differentiator 51 to the control voltage. Consequently, the clock signal outputted from the voltage-controlled oscillator 52 is adjusted in response to the differential waveform of the correction waveform.

Figure 8:
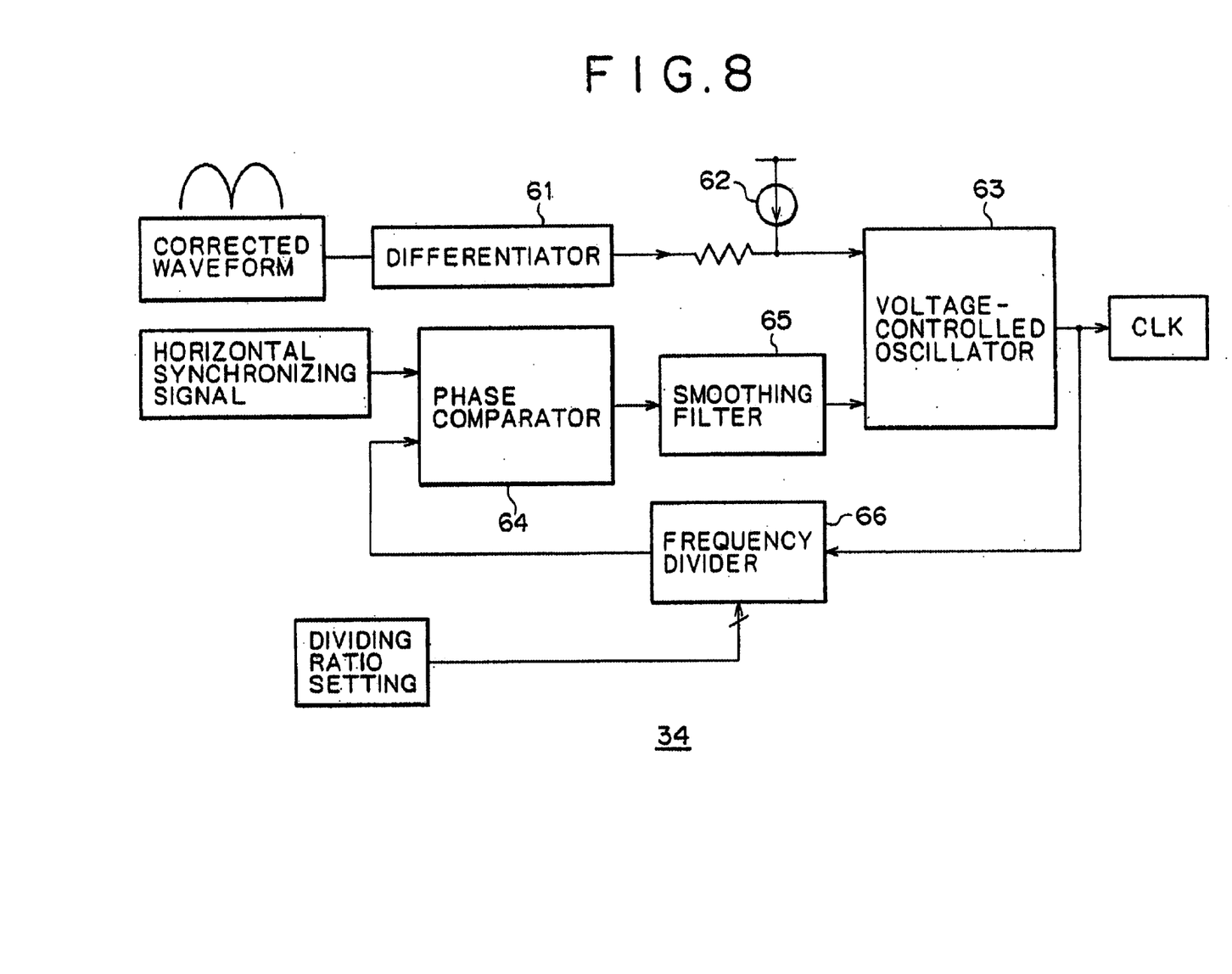
FIG. 8 is a block diagram showing another internal configuration of the clock signal generation circuit shown in FIG. 6.

FIG. 8 shows another configuration of the clock signal generation circuit 34. Referring to FIG. 8, the clock signal generation circuit 34 shown includes a differentiator 61, a current source 62, a voltage-controlled oscillator 63, a phase comparator 64, a smoothing filter 65, and a frequency divider 66. Also the clock signal generation circuit 34 shown in FIG. 8 must include three such clock signal generation circuits 34 having the configuration shown in FIG. 8 as described 22 above similarly to the clock signal generation circuit 34 shown in FIG. 7, but in FIG. 8, only the single clock signal generation circuit 34 is shown.

Further, similarly to the clock signal generation circuit 34 shown in FIG. 7, the clock signal generation circuit 34 shown in FIG. 8 may be configured otherwise such that the differentiator 61 provided in the clock signal generation circuit 34 is eliminated while the correction waveform outputting section 36 of the display apparatus 30 shown in FIG. 6 is designed to perform digital differential arithmetic operation upon production of a correction waveform and the correction waveform obtained by the differential arithmetic operation is inputted to the clock signal generation circuit 34.

The clock signal generation circuit 34 shown in FIG. 8 is different from the clock signal generation circuit 34 shown in FIG. 7 in that the clock signal for video signal outputting is synchronized with a horizontal synchronizing signal. Where the clock signal generation circuit 34 is configured in such a manner as shown in FIG. 8, feedback can be applied to clock generation thereby to adjust the clock signal while the clock signal is kept stable. Consequently, a clock signal stabilized against disturbance noise and so forth is produced, and strict requirements need not be required for such characteristics as the temperature distortion and the dispersion of the clock signal generation circuit 34.

In the clock signal generation circuit 34 shown-in FIG. 8, a position error correction waveform, for example, of red produced by the correction waveform outputting section 36 is added through the differentiator 61 to a frequency controlling reference current source of the voltage-controlled oscillator 63. Consequently, the clock to be outputted from the voltage-controlled oscillator 63 can be adjusted in response to the differential waveform of the correction waveform similarly as in the clock signal generation circuit 34 shown in FIG. 7.

Figure 9:
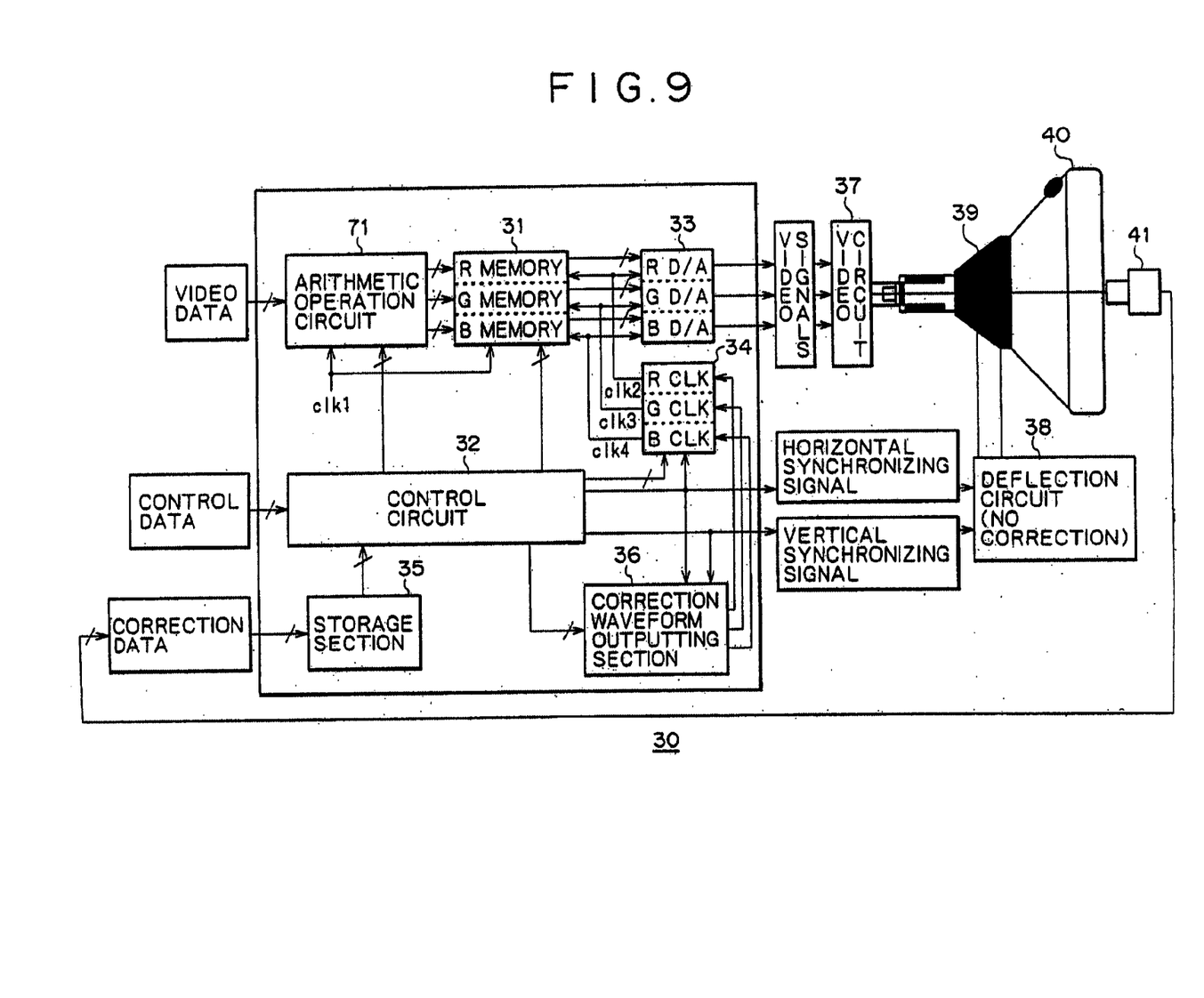
FIG. 9 is a block diagram showing another configuration of a display apparatus to which the present invention is applied.
Figure 10A:
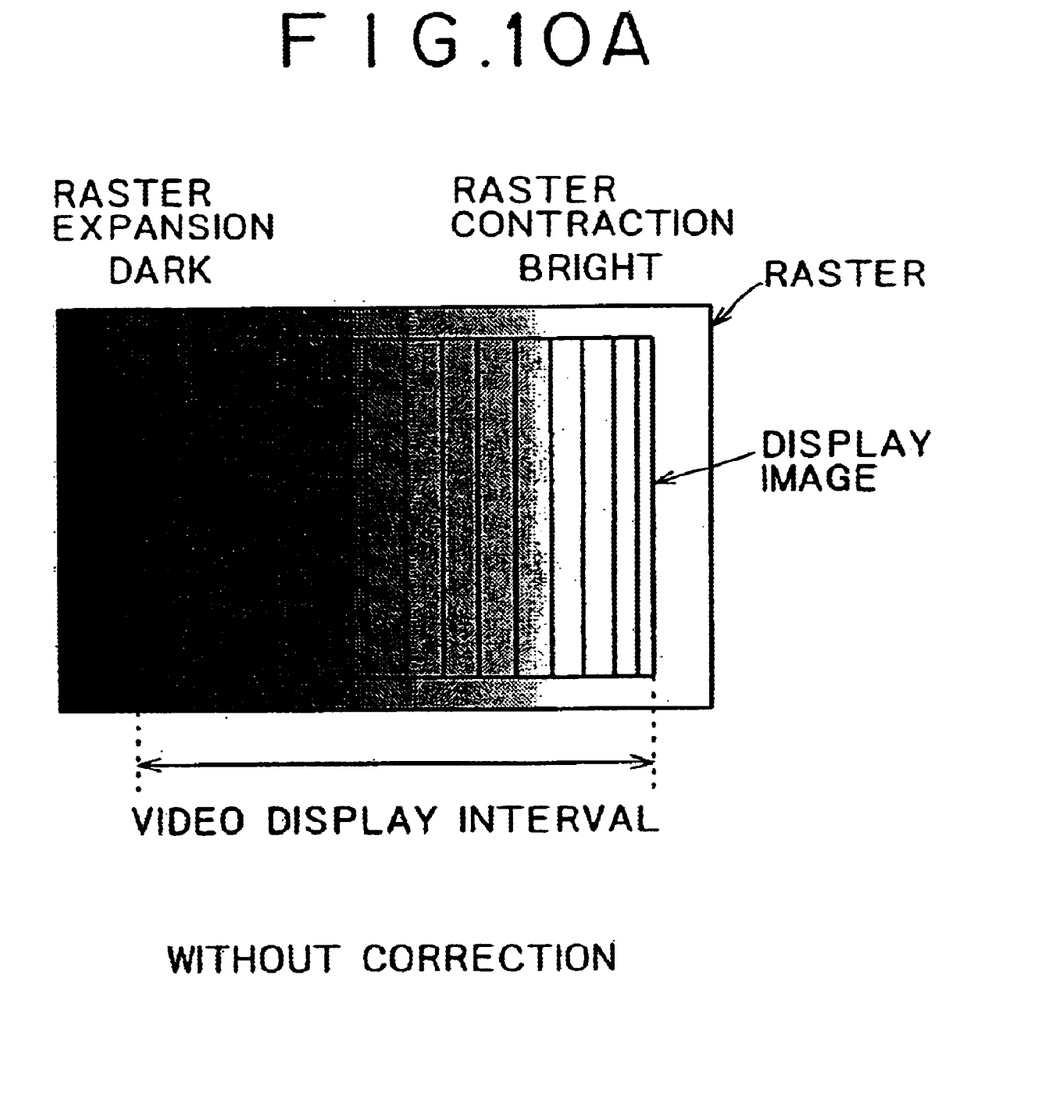
FIGS. 10A and 10B are schematic views illustrating horizontal linearity correction performed using the clock signal generation circuit of FIG. 8.

FIG. 9 shows another configuration of the display apparatus 30 to which the present invention is applied. Referring to FIG. 9, the display apparatus 30 corrects non-uniformity of the brightness or chromaticity of an image displayed on a cathode ray tube 40. The configuration of the display apparatus 30 is equivalent to the configuration of the display apparatus 30 shown in FIG. 9 except that an arithmetic operation circuit 71 is provided additionally.

Where image distortion correction is performed by output timing adjustment of video signal data, since distortion correction of a raster is not performed by the deflection circuit 38, some non-uniformity in density remains in the raster, and as a result, non-uniformity of the brightness of the screen occurs. FIG. 10A schematically illustrates non-uniformity in density of a raster when correction of horizontal linearity by the deflecting circuit is not performed. When correction of horizontal linearity by the deflection circuit is not performed, generally the raster at a left portion of the screen expands while the raster at a right portion of the screen contracts. In this instance, the left portion of the screen at which the raster expands is low in brightness while the brightness of the right portion of the screen at which the raster contacts is high. The brightness variation by non-uniformity in density of the raster cannot be corrected even where the output timing of video signal data is adjusted to perform horizontal linearity correction.

Figure 11:
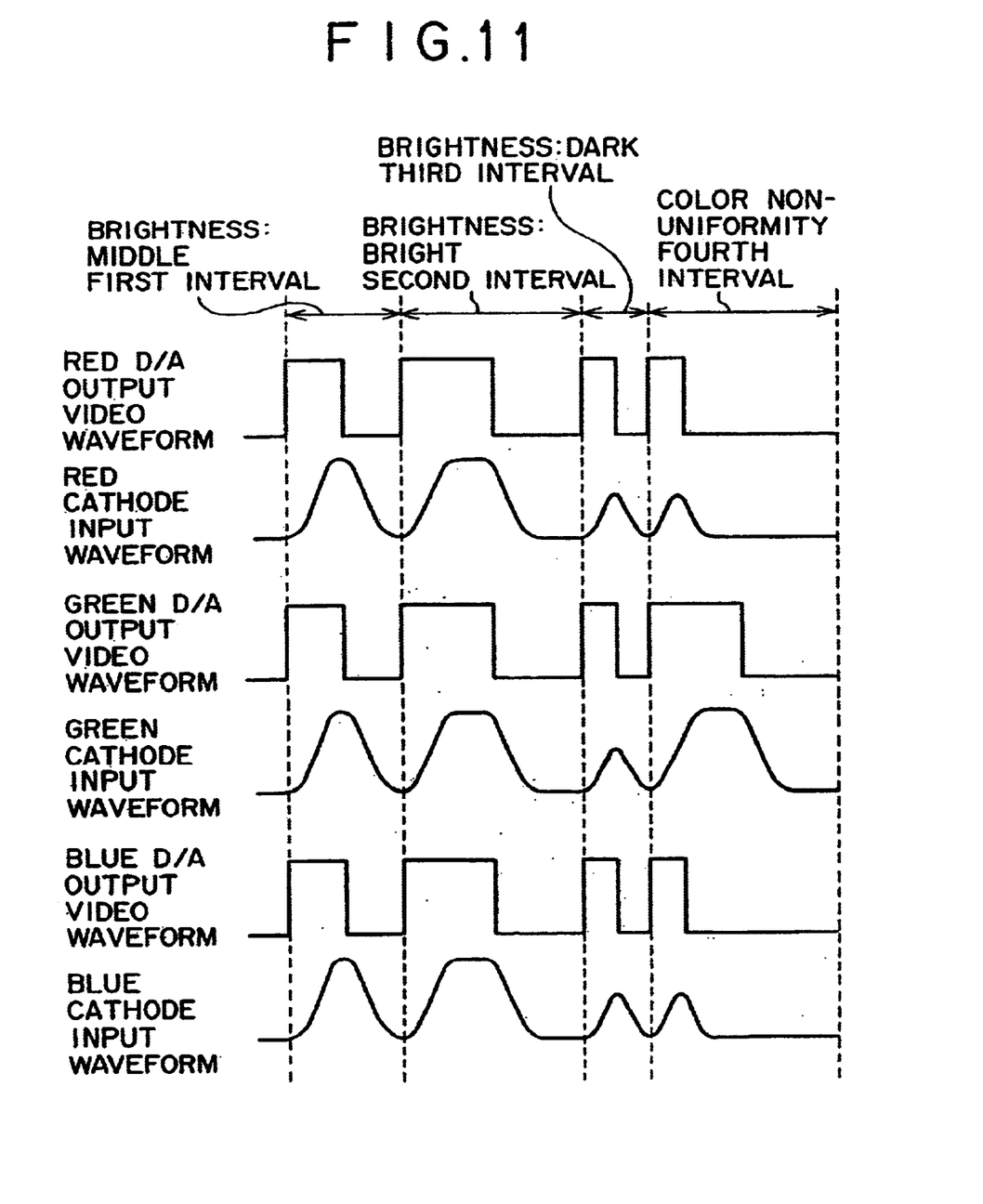
FIG. 11 is a waveform diagram illustrating the brightness and the chromaticity which are rendered non-uniform by a frequency characteristic of a video circuit.

Further, if a video signal which exhibits repetitions of on and off is inputted and the frequency characteristic of the video circuit 37 is sufficient for the modulation clock frequency, then the amplitude of the analog video waveform inputted to the cathode ray tube 40 shown in FIG. 11 is varied by the period of the modulation clock. As a result, the brightness varies as in the first to third periods shown in FIG. 11 and/or non-uniformity of the chromaticity occurs as in the fourth period.

Figure 10B:
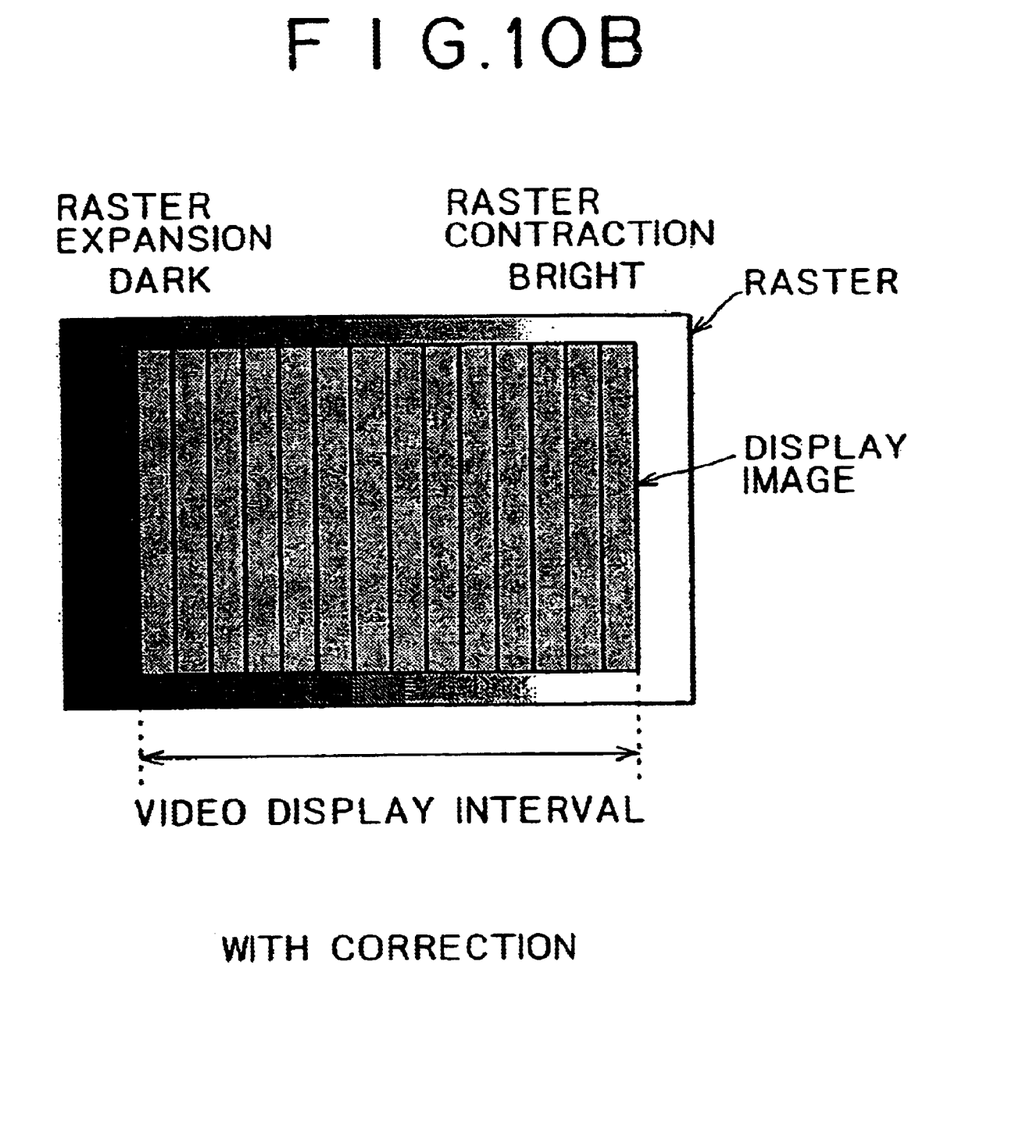

Thus, in the display apparatus 30 shown in FIG. 9, arithmetic operation processing of a video signal data value is performed by the arithmetic operation circuit 71 to effect correction so that the brightness and the chromaticity within a video display section may be uniform as seen in FIG. 10B.

Referring to FIG. 9, digital video data are first inputted to the arithmetic operation circuit 71. The arithmetic operation circuit 71 performs image data arithmetic operation based on correction parameters such as video size data, video phase data, signal frequency data and adjustment data for the three different clock signals calculated by the control circuit 32 and inputted thereto so that the non-uniformity of the brightness and the chromaticity may always be corrected optimally even when the signal frequency, raster size, video phase or clock adjustment amount is varied. The arithmetically operated video data are written into the memory circuit 31 at a timing of the first clock signal clk1.

Corresponding to position error correction waveforms of the three colors of red, green and blue produced by the correction waveform outputting section 36, a second clock signal clk2, a third clock signal clk3 and a fourth clock signal clk4 are generated by the clock signal generation circuit 34. The video data of red, green and blue are read out individually at timings of the clock signals clk2, clk3 and clk4, respectively, and converted into analog video signals by the D/A conversion circuit 33.

The video outputting timings can be adjusted in response to the position error correction waveforms of the three colors of red, green and blue in this manner, and miss convergence or image distortion of an image displayed on the cathode ray tube 40 can be corrected and besides the non-uniformity of the brightness and the chromaticity can be corrected optimally.

Since convergence correction or image distortion correction is performed in such a manner as described above, convergence correction using a convergence coil which exhibits high power loss and image distortion correction by a deflection circuit can be eliminated, and reduction of the circuit scale and power saving of the display apparatus can be achieved. Further, when compared with the conventional convergence correction methods, the problem of the limitation to the slew rate characteristic of an output amplifier for driving the correction coil or the eddy current loss in the inside of the cathode ray tube is eliminated, and a high degree of freedom in correction can be anticipated. Consequently, the present system can correct the convergence with a very high degree of accuracy.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

Figure 12:
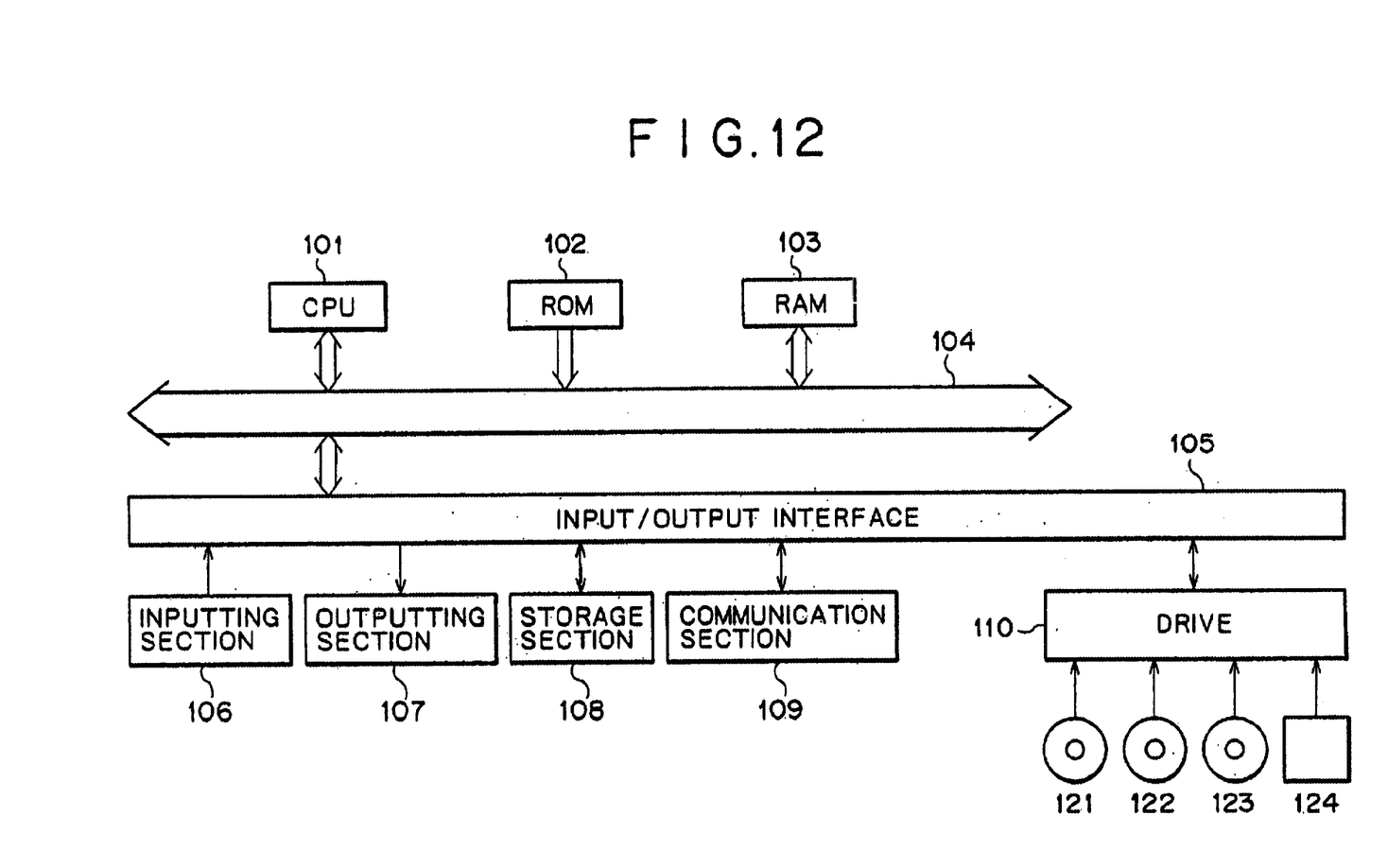
FIG. 12 is a block diagram showing various forms of a recording medium to which the present invention can be applied.

The recording medium is formed as a package medium such as, as shown in FIG. 12, a magnetic disk 121 (including a floppy disk), an optical disk 122 (including a CD-ROM (Compact Disk-Read Only Memory) and a DVD (Digital Versatile Disk)), or a magneto-optical disk 123 (including an MD (Mini-Disk)), or a semiconductor memory 124 which has the program recorded thereon or therein and is distributed in order to provide the program separately from a computer. Else, the recording medium is formed as a ROM 102 or a hard disk including a storage section 108 which has the program stored therein and is provided to a user in a state wherein it is incorporated in a computer in advance.

It is to be noted that, in the present specification, the steps which describe the program provided as a medium may be but need not necessarily be processed in a time series in the order as described, and include processes which are executed parallelly or individually without being processed in a time series.

Further, in the present specification, the term "system" represents an entire apparatus which is composed of a plurality of apparatus.

While preferred embodiments of the present invention have been described using specific terms, such description is for illustrative purposes only, and it is to be understood that changes and variations may be made without departing from the spirit or scope of the following claims.

What is claimed is:

1. An image processing apparatus, comprising:

inputting means for inputting a plurality of video signals corresponding to different colors;

storage means for storing the plurality of video signals;

production means for producing correction data to be used for correction of convergence of said different colors;

generation means for generating a plurality of clock signals, each clock signal of the plurality of clock signals generated for each of the video signals corresponding to a particular color of the different colors based on the correction data produced for the particular color; and readout means for reading out each video signal of the plurality of video signals corresponding to the particular color in response to said each clock signal corresponding to the particular color.

2. An image processing apparatus according to claim 1, wherein the plurality of video signals inputted through said inputting means corresponds to at least two of video signals of red, green, and blue.

3. An image processing apparatus according to claim 1, wherein the plurality of video signals inputted through said inputting means are digital video signals which are obtained by conversion of analog video signals, said digital video signals transmitted and decoded by transition minimized differential signaling.

4. An image processing apparatus according to claim 1, further comprising arithmetic operation means for arithmetically operating a correction parameter to be used for correction of image distortion from data which include at least one of synchronizing signal data, video size data and video phase data, said generation means generating said each clock signal based on the correction parameter.

5. An image processing apparatus according to claim 4, further comprising conversion means for converting the plurality of video signals inputted through said inputting means into video signals whose non-uniformity in brightness and chromaticity are corrected based on the correction parameter arithmetically operated by said arithmetic operation means.

6. An image processing method, comprising:
controlling storage of a plurality of video signals corresponding to different colors;
producing correction data to be used for correction of convergence of said different colors;
generating a plurality of clock signals, each clock signal of the plurality of clock signals generated for each of the video signals corresponding to a particular color of the different colors based on the correction data produced for the particular color; and
controlling read out of each video signal of the plurality of video signals corresponding to the particular color in response to said each clock signal corresponding to the particular color.

7. A recording medium on which a computer-readable program is recorded, the program comprising:
controlling storage of a plurality of video signals corresponding to different colors;
producing correction data to be used for correction of convergence of said different colors;
generating a plurality of clock signals, each clock signal of the plurality of clock signals generated for each of the video signals corresponding to a particular color of the different colors based on the correction data produced for the particular color; and
controlling read out of each video signal of the plurality of video signals corresponding to the particular color in response to said each clock signal corresponding to the particular color.

8. An image processing apparatus according to claim 1, wherein the plurality of video signals inputted through said inputting means are digital video signals which are obtained by conversion of analog video signals, said digital video signals transmitted and decoded by low voltage differential signaling.

9. An image processing apparatus according to claim 1, wherein the plurality of video signals inputted through said inputting means are digital video signals which are obtained by conversion of analog video signals, said digital video signals transmitted and decoded by giga-bit video interface.

* * * * *